United States Patent Office 3,378,576
Patented Apr. 16, 1968

3,378,576
NITRATE ESTERS OF TETRAHYDROXY-3,6-DINITROCYCLOHEXANE
Andrew H. Dinwoodie, Dalry, and Godfrey Fort, Ardrossan, Scotland, assignors to Imperial Chemical Industries Limited, London, England, a corporation of Great Britain
No Drawing. Filed Nov. 28, 1966, Ser. No. 597,198
Claims priority, application Great Britain, Dec. 9, 1965, 52,330/65
4 Claims. (Cl. 260—466)

ABSTRACT OF THE DISCLOSURE

Nitrate ester derivatives of 1,2,4,5-tetrahydroxy-3,6-dinitrocyclohexane, e.g., 1,2,4,5-tetranitrato - 3,6-dinitrocyclohexane. These derivatives are explosive and useful high-energetic constituents of propellant compositions and blasting explosives. They are made by reacting 1,2,4,5-tetrahydroxy-3,6-dinitrocyclohexane with a nitrating agent.

---

This invention relates to novel nitrate ester derivatives of 1,2,4,5-tetrahydroxy-3,6-dinitrocyclohexane, and to the preparation of such compounds. These compounds are explosive and are useful high-energetic constituents of propellent compositions and blasting explosives.

In accordance with the invention a nitrate ester derivative of 1,2,4,5-tetrahydroxy-3,6-dinitrocyclohexane is prepared by reacting 1,2,4,5-tetrahydroxy - 3,6-dinitrocyclohexane with a nitrating agent. The reaction for the preparation of the fully nitrated ester derivative may be represented as:

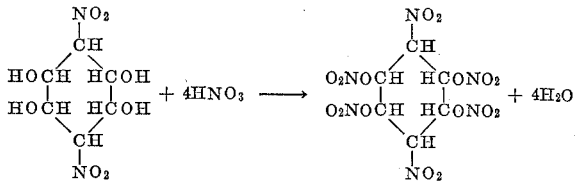

The 1,2,4,5-tetrahydroxy-3,6-dinitrocyclohexane used as starting material is conveniently prepared by reacting glyoxal with nitromethane in a basic solution as described by F. W. Lichtenthaler and H. O. L. Fischer, J. Amer. Chem. Soc. 1961, 83, 2005.

The nitrating agent is conveniently nitric acid, which is preferably used in admixture with a dehydrating agent such as, for example, acetic anhydride, trifluoroacetic anhydride, concentrated sulphuric acid or phosphoric acid.

The use of a large excess of nitrating agent and the presence of a strong dehydrating agent which is not a strong acid favours the production of the fully nitrated ester, but if the dehydrating agent is itself a strong acid, such as, for example, sulphuric acid, the mononitrate only is formed. In the absence of a dehydrating agent or when the nitrating agent is not present in large excess, the dinitrate ester derivative is the preponderant product.

The reaction is preferably carried out at a temperature below room temperature. Conveniently the reaction mixture is chilled to about 5° C. or less. If desired, the reaction may be carried out in presence of an inert liquid medium such as, for example, chloroform.

The tetranitrate ester of the invention has a heat of combustion (estimated) of 1700 calories/g. Propellant compositions containing this compound are more energetic than corresponding compositions containing ammonium perchlorate.

The invention is further illustrated by the following Examples in which all parts and percentages are by weight.

EXAMPLE 1

2.0 parts of 1,2,4,5-tetrahydroxy-3,6-dinitrocyclohexane prepared by the method of Lichtenthaler and Fischer, J. Amer. Chem. Soc., 1961, 83, 2005 were mixed in an open vessel with 16.3 parts of acetic anhydride and the mixture cooled to −5° C. with stirring. 7.5 parts of 98–100% nitric acid were then added during approximately 15 minutes with stirring and cooling. The rate of addition was such that the temperature of the reaction mixture did not rise above 2° C. When 5–10 parts of nitric acid had been added the mixture became difficult to stir due to the precipitation of solid material but stirring became easier as further acid was added due to dissolution of the suspended solid. At a late stage during the addition of the acid a clear solution was obtained but solid began to separate out again before all the acid had been added. After all the acid had been added the mixture was stirred for 1 hour at 0° C. and the solid precipitate was then filtered off, washed thoroughly with water at 0° C., and dried in a vacuum desiccator at room temperature to give 1.9 parts of nitrated product. The filtrate from the reaction mixture was added to 250 parts of crushed ice and the solid precipitate filtered off and similarly washed and dried to give a further 1.0 parts of nitrated product. The total yield of crude 1,2,4,5-tetranitrato-3,6-dinitrocyclohexane (2.9 parts) was 82.5% of the theoretical. The crude product was purified by dissolution in cold acetone and reprecipitation by addition of water to give a colourless crystalline product which was found to contain C, 18.6%; H, 2.3%; N, 19.3%. 1,2,4,5-tetranitrato-3,6-dinitrocyclohexane ($C_6H_6N_6O_{16}$) requires: C, 17.2%; H, 1.43%; N, 20.1%. The purified product melted at 175–7° C. with decomposition. The infra-red spectrum, determined on a dispersion of the solid product in a high-boiling aliphatic liquid hydrocarbon, showed no absorption in the $3\mu$ region which indicated that the nitrated product contained no hydroxyl groups. These were strong absorption bands at $5.95\mu$ and $7.7$–$7.9\mu$ which are characteristic of nitrate ester. There was also a strong absorption band at $6.3$–$6.4\mu$, indicating the presence of nitro groups.

No ignition occurred when a ½ kg. mild steel hammer was dropped from a height of 5 cm. on to a thin layer of the finely divided product on a mild steel anvil, but the sample exploded when the height was 10 cm. When a 0.1 g. sample was heated in an open, round-bottomed glass tube at a rate of 5° C. per minute it exploded at 184° C.

EXAMPLE 2

2.0 parts of 1,2,4,5-tetrahydroxy-3,6-dinitrocyclohexane were added to a cooled mixture of 16.3 parts acetic anhydride and 7.5 parts of 98–100% nitric acid at such a rate that the temperature of the reaction mixture did not rise above 2° C. After all the solid had been added the mixture was stirred for 1 hour at 0° C., then poured on to 250 parts of crushed ice and the solid precipitate filtered off, washed thoroughly with water and dried in a vacuum desiccator at room temperature to give 2.7 parts of crude 1,2,4,5-tetranitrato-3,6-dinitrocyclohexane. After reprecipitation from acetone, the product was found to contain: C, 18.9%; H, 1.6%; N, 19.9%. The purified product melted at 171–2° C. with decomposition. The infrared spectrum was the same as that of the product of Example 1.

No ignition occurred when a ½ kg. mild steel hammer was dropped from a height of 10 cm. on to a thin layer of the finely divided product on a mild steel anvil, but the sample exploded when the height was 20 cm. When a 0.1 g. sample was heated in an open, round-bottomed glass tube at a rate of 5° C. per minute, it exploded at 173° C.

EXAMPLE 3

2.0 parts of 1,2,4,5-tetrahydroxy-3,6-dinitrocyclohexane were mixed in an open vessel with 28.8 parts of chloroform and the mixture cooled to −5° C. with stirring. 30 parts of 98–100% nitric acid were then added with stirring and cooling at such a rate that the temperature of the reaction mixture did not rise above 2° C. At an early stage in the addition of the acid a green oil separated out but at a later stage the oil redissolved and a solid separated out. After all the acid had been added the mixture was stirred for 1 hour at 0° C. and then the solid precipitate was filtered off, washed thoroughly with water at 0° C. and dried in a vacuum desiccator at room temperature to give 1.0 parts of nitrated product. The crude product was purified by recrystallisation from aqueous ethanol to give a colourless crystalline product which was found to contain: C, 22.2%; H, 2.6%; N, 16.9%. Dihydroxydinitrato - 3,6 - dinitrocyclohexane ($C_6H_8N_4O_{12}$) requires: C, 22.0%; H, 2.4%; N, 17.1%. The product did not melt on being heated but decomposed at 215° C. The infra-red spectrum showed absorption bands at $2.8\mu$ characteristic of hydroxyl groups, at $6.0\mu$ and $7.75-7.85\mu$ which are characteristic of a nitrate ester, and a strong absorption band at $6.4\mu$, indicating the presence of nitro groups.

The proton magnetic resonance spectrum at 60 megacycles/sec. of the product in acetone solution, using tetramethylsilane as internal reference, showed five pairs of doublets in the region $3.7-4.8\mu$. These peaks were consistent with the structure assigned to this compound.

No ignition occurred when a ½ kg. mild steel hammer was dropped from a height of 20 cm. on to a thin layer of the product on a mild steel anvil, but the sample exploded when the height was 30 cm.

EXAMPLE 4

2.0 parts of 1,2,4,5-tetrahydroxy-3,6-dinitrocyclohexane were mixed with 5.6 parts of acetic anhydride and the mixture cooled to 0° C. with stirring. A mixture of 2.4 parts of 98–100% nitric acid and 5.6 parts of acetic anhydride was then added with stirring and cooling at such a rate that the temperature did not exceed 2° C. After all the acid had been added the mixture solidified to a solid mass which was washed thoroughly with water at 0° C. and dried in a vacuum desiccator to give 1.1 parts of dihydroxy-dinitrato-3,6-dinitrocyclohexane. After recrystallisation from aqueous ethanol the product was found to have an infra-red spectrum identical to that of the product of Example 3.

EXAMPLE 5

1.9 parts of 1,2,4,5-tetrahydroxy-3,6-dinitrocyclohexane were added to a stirred mixture of 27.6 parts of 96% sulphuric acid and 15.2 parts of 98–100% nitric acid, cooled to 0–5° C., at such a rate that the temperature of the mixture did not exceed 5° C. After addition of all the solid, the mixture was stirred for one hour at 5° C. and the solid material filtered off and thoroughly washed with water at 0° C. The product was purified by dissolution in acetone and reprecipitation by addition of water to give 0.5 part of a colourless crystalline product which was dried in a vacuum desiccator and which was found to contain: C, 25.0%; H, 3.3%; N, 13.9%. 1,2,4 - trihydroxy - 5 - nitrato - 3,6 - dinitrocyclohexane ($C_6H_9N_3O_{10}$) requires: C, 25.4%; H, 3.2%; N, 14.8%. The purified product melted at 195–200° C. with decomposition. The infra-red spectrum showed strong absorption bands at $2.85\mu$ characteristic of the hydroxyl group, at $6.05$, $7.8$ and $7.9\mu$ characteristic of a nitrate ester and at $6.55\mu$ indicating the presence of nitro groups. Other strong absorption bands occurred at 3.1, 7.5, 7.65 and $8.9\mu$.

The proton magnetic resonance spectrum at 60 megacycles/sec. in acetone solution using tetramethylsilane as internal reference showed peaks at 5.2 and $5.4\mu$ characteristic of the hydroxyl groups which were removed by deuteration and peaks at $3.7\mu$ assigned to the hydrogen nuclei attached to the ring.

No ignition occurred when a ½ kg. mild steel hammer was dropped from a height of 200 cm. on to a thin layer of the sample on a mild steel anvil.

What we claim is:
1. A nitrate ester derivative of 1,2,4,5-tetrahydroxy-3, 6-dinitrocyclohexane.
2. 1,2,4,5-tetranitrato-3,6-dinitrocyclohexane.
3. Dihydroxy-dinitrato-3,6-dinitrocyclohexane.
4. 1,2,4-trihydroxy-5-nitrato-3,6-dinitrocyclohexane.

References Cited

UNITED STATES PATENTS 3,301,891  1/1967  Schickh _____ 260—466

OTHER REFERENCES

Urbanski, Chemistry and Technology of Explosives, vol. II, Pergamon Press, New York, 1965, pp. 200 to 204.

CARL D. QUARFORTH, *Primary Examiner.*

L. A. SEBASTIAN, *Assistant Examiner.*